(12) United States Patent  
Enyedy

(10) Patent No.: US 8,569,653 B2
(45) Date of Patent: Oct. 29, 2013

(54) DRIVE ROLL ASSEMBLY FOR WIRE FEEDER

(75) Inventor: Edward Enyedy, Eastlake, OH (US)

(73) Assignee: Lincoln Global, Inc., City of Industry, CA (US)

( * ) Notice: Subject to any disclaimer, the term of this patent is extended or adjusted under 35 U.S.C. 154(b) by 678 days.

(21) Appl. No.: 12/610,724

(22) Filed: Nov. 2, 2009

(65) Prior Publication Data

US 2011/0100969 A1    May 5, 2011

(51) Int. Cl.
*B23K 9/12* (2006.01)

(52) U.S. Cl.
USPC ........................................ 219/136; 219/137 R

(58) Field of Classification Search
USPC ....................................................... 219/136
See application file for complete search history.

(56) References Cited

U.S. PATENT DOCUMENTS

| | | | |
|---|---|---|---|
| 5,816,466 A | 10/1998 | Seufer | |
| 5,836,539 A * | 11/1998 | Grimm et al. | 242/615.3 |
| 6,286,748 B1 | 9/2001 | Cooper | |
| 6,427,894 B1 | 8/2002 | Blank et al. | |
| 6,505,974 B2 | 1/2003 | Giesler et al. | |
| 6,557,742 B1 | 5/2003 | Bobeczko et al. | |
| 6,568,578 B1 | 5/2003 | Kensrue | |
| 7,374,074 B2 | 5/2008 | Matiash | |
| 7,441,682 B2 | 10/2008 | Kerekes et al. | |
| 2004/0011776 A1* | 1/2004 | Mukai et al. | 219/137.71 |
| 2006/0081675 A1 | 4/2006 | Enyedy | |
| 2007/0119840 A1* | 5/2007 | Flattinger et al. | 219/137.31 |

FOREIGN PATENT DOCUMENTS

EP    1016486 A1    7/2000

OTHER PUBLICATIONS

International Search Report with Written Opinion for application PCT/IB2010/002770 dated Mar. 15, 2011.
Kempii, Components, Date Unknown.
Miller, Components Miller S24A, Date Unknown.
Fronius, Components, Date Unknown.
Lincoln, Components, Date Unknown.
International Preliminary Report on Patentability for PCT/IB2010/002770 dated Mar. 9, 2012.

* cited by examiner

*Primary Examiner* — David Vu
*Assistant Examiner* — Jonathan Han
(74) *Attorney, Agent, or Firm* — Hahn Loeser & Parks LLP

(57) ABSTRACT

A wire feeder includes a wire feeder housing that may enclose one or more drive rollers rotatably connected with respect to the wire feeder housing for engaging welding wire. The one or more drive rollers may be adjustable and adapted to drive the welding wire to a welding gun connected to the wire feeder. A drive motor is incorporated for delivering power for rotating the one or more drive rollers. Friction reducing devices, such as bearings, may be utilized and positioned between one or more driver rollers and the housing, where the bearings are electrically non-conducting for preventing the discharge of electrical energy across the bearing surfaces.

28 Claims, 5 Drawing Sheets

DRIVE ROLL ASSEMBLY FOR WIRE FEEDER

TECHNICAL FIELD

The present invention pertains to welding wire feeders, and more particularly, to welding wire feeders having electrically isolated components.

BACKGROUND OF THE INVENTION

Wire feeders, like those used in arc welding applications, convey wire from a continuous feed source to a weld torch. In many instances, the wire is fed from a reel or drum at a rate determined by the operating parameters of the power source. Accordingly, the wire feeder includes a drive motor that delivers the wire at various feed rates. Typically pinch rollers are used to grip the wire pushing, or in certain cases pulling, it toward the work piece. To facilitate smooth operation, bearings may be included that allow the pinch rollers to rotate with reduced friction.

BRIEF SUMMARY

The embodiments of the present invention pertain to a wire feeder having a wire feeder housing that encloses one or more drive rollers rotatably connected with respect to the wire feeder housing for engaging welding wire. The one or more drive rollers may be adjustable and adapted to drive the welding wire to a welding gun connected to the wire feeder. A drive motor is included for delivering power and more specifically torque for rotating the one or more drive rollers. Friction reducing devices, such as bearings, may be utilized and positioned between one or more driver rollers and the housing, where the bearings are electrically non-conducting for preventing the discharge of electrical energy across the bearing surfaces.

DETAILED DESCRIPTION OF THE INVENTION

Figure 1:
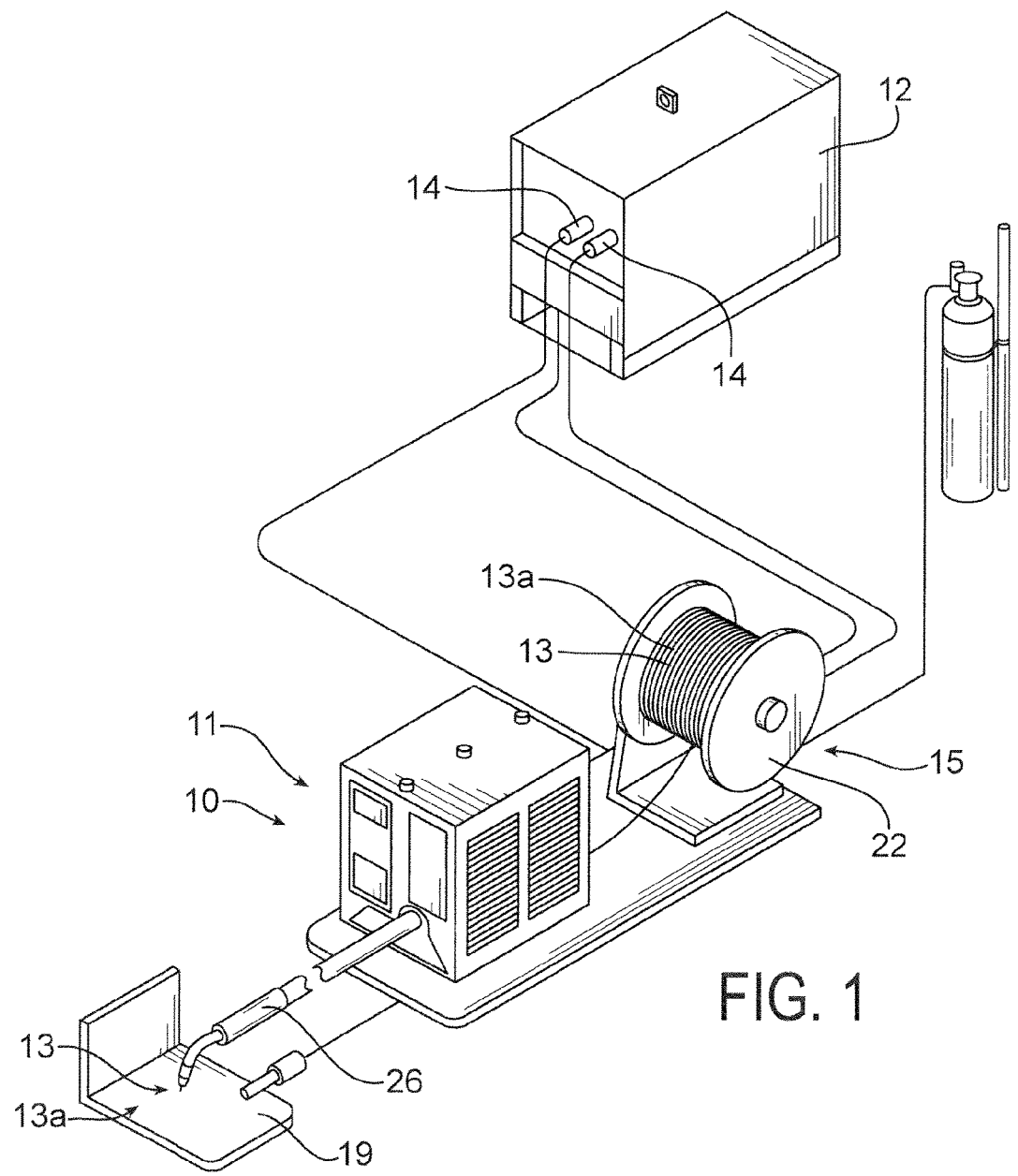
FIG. 1 is a perspective view of a wire feeder used in a welding application according to one of the embodiments of the subject invention.

Referring now to the drawings wherein the showings are for purposes of illustrating embodiments of the invention only and not for purposes of limiting the same, FIG. 1 shows a wire feeder depicted generally at 10. The wire feeder 10 comprises a device for conveying wire 13 from a feed source 15, i.e. wire supply 15, for use in a particular application. For illustrative purposes, the wire feeder 10 will be described in the context of arc welding. However, other applications will become apparent to those skilled in the art, all of which should be construed as falling within the scope of coverage of the embodiments of the subject invention. In one embodiment, wire 13 may comprise a welding electrode 13a, also referred to herein as welding wire 13a, and wire feeder 10 may comprise welding wire feeder 11. Wire 13, 13a may be drawn continuously from a reel 22, box or drum, and delivered to a work piece 19, which in the current embodiment is a weldment. Accordingly, the wire feeder 10, or welding wire feeder 11, may include a drive assembly that utilizes power from one or more locomotive devices that drive the wire 13, 13a to the application work site or work piece 19.

With continued reference to FIG. 1, the welding wire feeder 11 may be used in conjunction with a welding power source 12 as manufactured by, for example, the Lincoln Electric company in Cleveland, Ohio. The welding power source 12 may receive electrical input power, from an outside source, that is directed to an onboard transformer, not depicted in the figures. Output from the transformer may subsequently be connected to welding output terminals 14, or studs 14 of the welding power source 12. Additionally, the welding power source 12 may include a regulated power supply for delivering electrical power to one or more welding accessories, which may include the welding wire feeder 11. A welding gun, designated generally at 26, and wire conduit may be electrically connected to the welding power source 12 through the welding wire feeder 11 for delivering welding current in a manner known in the art. It follows that welding wire 13a is fed through a weld gun 26 and metered out, i.e. dispensed, at the discretion of the application and/or end user in any manner suitable for conducting the welding process. It is noted that the electrode, i.e. welding wire 13, conducts electricity for establishing a welding arc, wherein the electrode is conveyed to the work piece 19 having a voltage potential equal to or approximately equal to the output voltage of the welding power source 12, which may be substantially greater than ground.

Different modes of conveying welding wire 13a are known in the art, an example of which includes pushing the welding wire 13a to the weld gun 26 via power or torque provided by the locomotive device. Other modes of conveying welding wire 13a include push/pull modes that utilize multiple locomotive devices. In any instance, welding wire 13a is delivered to a weld gun 26, which may have a trigger or other activation mechanism for dispensing the wire 13 at the users discretion. At times, it may be necessary to deliver welding wire 13a at varying rates of feed. Therefore, the locomotive device, which may comprise or include a drive motor 18, has an output that is adjustable for varying the rate which welding wire 13a is discharged from the wire feeder 10. In particular, the drive motor 18 itself may be a variable speed drive motor 18.

It is noted here that the wire feeder 11 and/or drive motor(s) 18 may draw operating power from the regulated power supply onboard the welding power source 12. Alternatively, the welding wire feeder 11 may draw power from the open circuit voltage of the welding power source 12, or an altogether separate power source. Still any manner of providing power to operate the welding wire feeder 11 and/or the drive motors 18 may be chosen with sound engineering judgment as is appropriate for use with the embodiments of the present invention.

Figure 2:
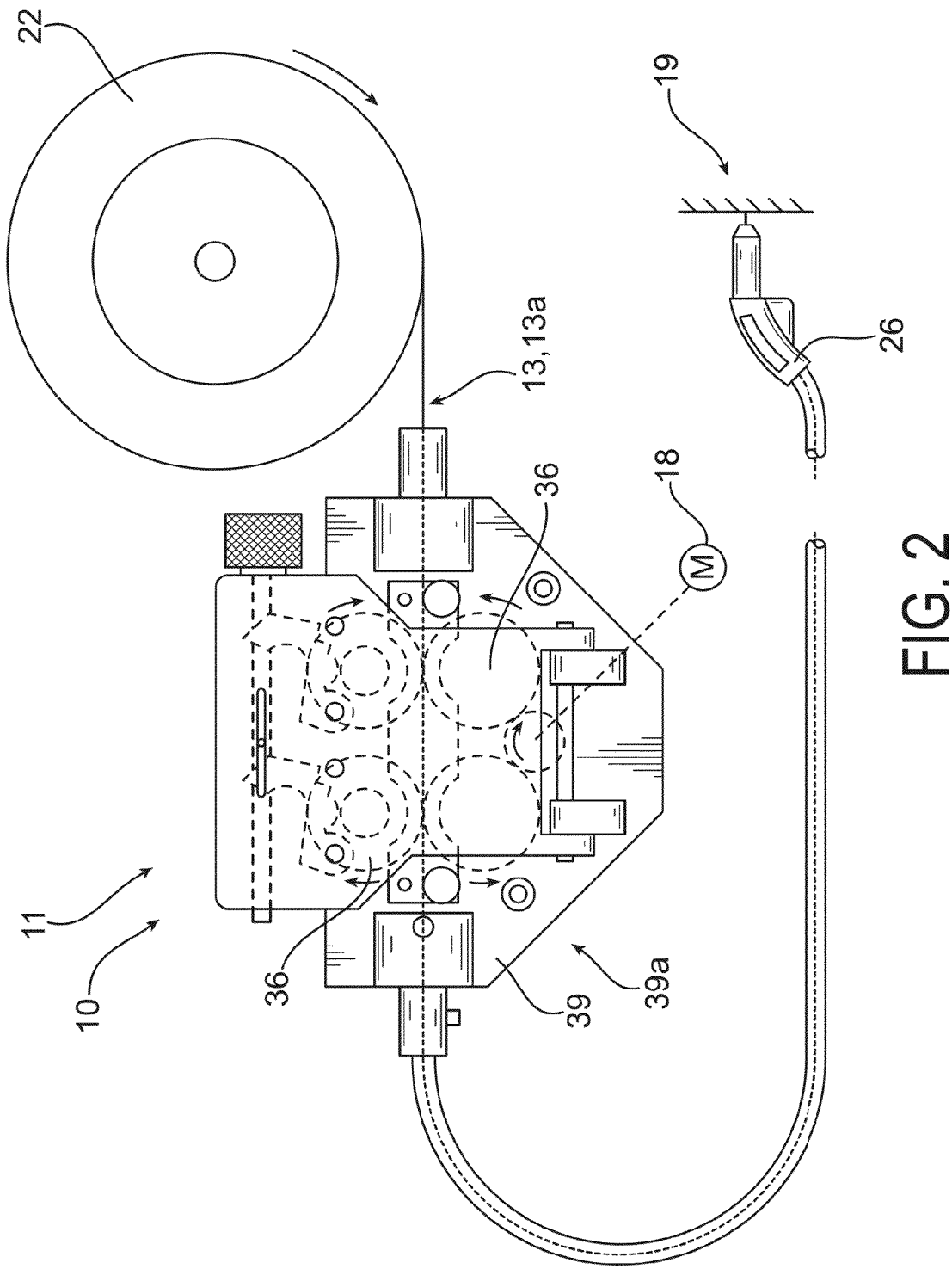
FIG. 2 is a side view of an wire feeder and wire feed source, according to the embodiments of the subject invention.
Figure 3:
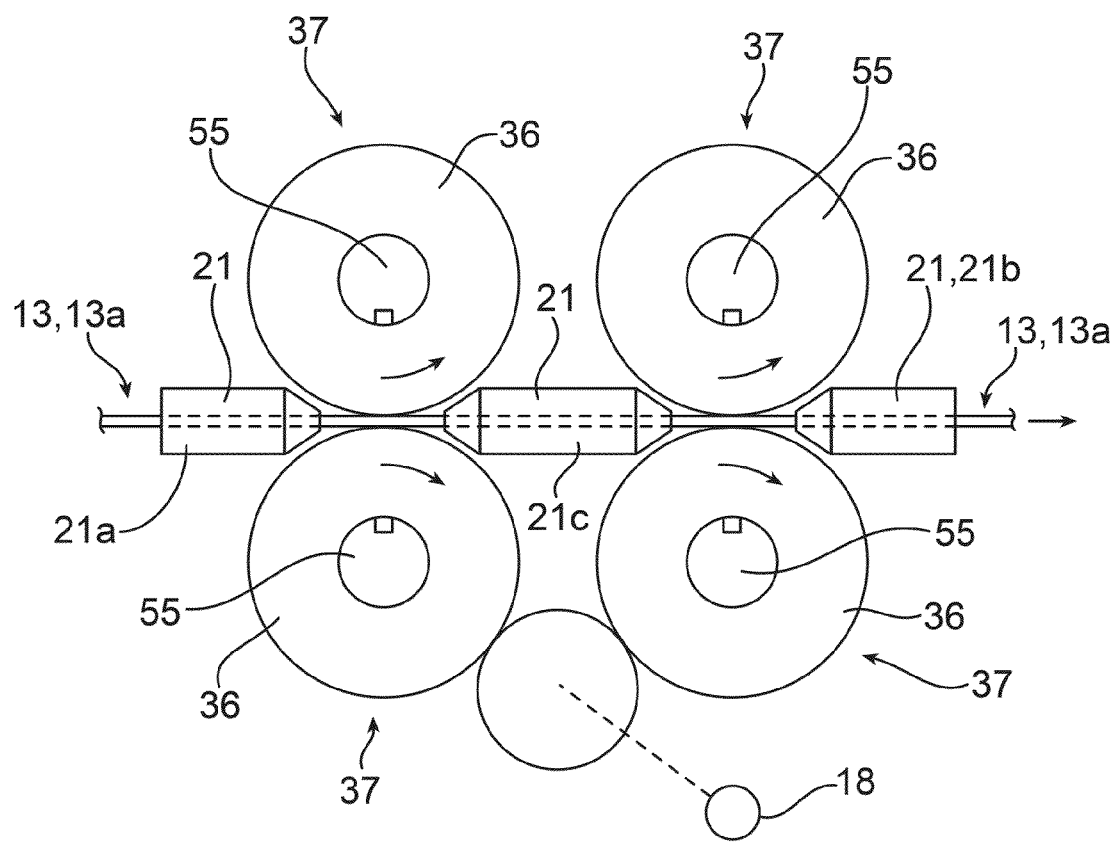
FIG. 3 is a close up side view of drive rollers feeding wire, according to the embodiments of the subject invention.

With continued reference to FIG. 1 and now also to FIGS. 2 and 3, the welding wire feeder 11 may include a drive assembly, or drive roll assembly. As mentioned above, the drive motor 18, also called a wire feeder motor 18, delivers power, i.e. torque, to convey the welding wire 13a to the weld gun 26 and subsequently to the work piece 19. Drive rollers 36 are included that grip the welding wire 13a for pushing or pulling the welding wire 13a in the appropriate direction, i.e.

toward the work piece. The drive rollers 36 are rotatably connected with respect to a frame member or other portion of the wire feeder 11. In one particular embodiment, the drive rollers 36 are rotatably connected to a feed plate 39 or possibly the wire feeder housing. A friction reducing device may be disposed between the drive rollers 36 and the feed plate 39 facilitating smooth and consistent operation of the welding wire feeder 11. In an exemplary manner, bearings 50, shown in FIG. 4, may be incorporated between the drive rollers 36 and the feed plate 39, although other friction reducing devices including, but not limited to, bushings may also be utilized. Still, any type of device that reduces rolling friction may be used to facilitate sustained operation of the driver rollers 36 as is appropriate for use with the embodiments of the present invention.

With reference to FIG. 3, the drive roll assembly may include a plurality of electrically conductive wire support guides 21 spaced along a wire trajectory. The wire support guides 21 may each incorporate a wire passage, or through-hole, for guiding the wire 13, 13*a*. The wire support guides 21 may be oriented such that the wire passages are axially aligned and thereby define the wire trajectory in the region between the driver rollers 36, which may comprise adjacently positioned pairs of drive rollers 36. The plurality of wire support guides 21 may include first and second end guides 21*a*, 21*b*. Additionally, a center guide 21*c* may be disposed between pairs of drive rollers 36. Still, it will be appreciated that any configuration and quantity of wire support guides 21 and drive rollers 36 may be included as chosen with sound judgment.

Each drive roller 36, in accordance with one embodiment of the subject invention, may include an outer circumference 37 for contacting the welding wire 13*a* and a hub 54 for rotation about a central axis. In an exemplary manner, the drive rollers 36 may be cylindrical in configuration, or more specifically disk-shaped, although the particular configuration should not be construed as limiting. The surface, i.e. the outer circumference 37, of the driver roller 36 may be comprised of a sufficiently hardened material, like steel, that is durable and suitable for gripping the wire 13, 13*a*. In one embodiment, drive rollers 36 may be disposed in pairs along the wire trajectory with each drive roller pair being supported on opposing sides thereof such that respective outer circumferences 37 contact opposite sides of the wire 13, 13*a*. It is noted that the central axes of respective drive rollers 36 extend substantially parallel with one another and generally transverse to the trajectory of the wire 13, 13*a*. In one particular embodiment, the relative position of the drive rollers 36 in one set, or pair, may be adjustable for use with wires of different diameters. Stated differently, the outer circumference of one drive roller 36 may be adjustable with respect to the outer circumference of an adjacent driver roller 36 for changing the distance therebetween thus accommodating different sizes of wire 13, 13*a*. In this manner, the driver roller pairs may be selectively positioned for gripping the welding wire 13, 13*a* with the appropriate amount of gripping force.

The hubs 54 of the drive rollers 36 may be rotatably supported by the feed plate 39 or other portion of the housing 39*a*, as previously mentioned. In one embodiment, the hubs 54 are supported by bearing(s) 50 incorporating a plurality of rolling elements, or alternatively by bushings. However, any means for facilitating sustained rotational operation of the driver rollers 36 may be chosen as is appropriate for use with the embodiments of the subject invention. Shafts 55 may be included that extend from the hub 54 and into engagement with a bearing race. In one exemplary manner, the drive rollers 36 may be mounted on corresponding shafts 55 for rotation therewith by a key and keyway arrangement, although any suitable arrangement for engaging the drive rollers 36 may be incorporated. Additionally, shafts 55 for each set or pair of drive rollers 36 may be drive-ably engaged with the drive motor 18 and with one another such that the shafts 55 rotate together for conveying the wire 13, 13*a* in a desired direction. The shafts 55 may be drive-ably engaged via gears or pulleys and belts, not shown, retained on the shafts 55 by any suitable mechanism, like for example a set screw or other fastener. It will be understood that the gears or pulleys may have sufficient clearance between the extents thereof to accommodate relative radial movement of the outer circumferences 37 of the drive rollers 36 in a manner consistent with that described above. It is noted here that the shafts 55 and corresponding driver rollers 36 rotate in opposing directions for advancing the wire 13, 13*a* in a designated direction. In other words, the driver roller 36 on one side of the wire 13, 13*a* may rotate clockwise while the drive roller 36 on the opposing side of the wire 13, 13*a* rotates counterclockwise, as illustrated by the arrows in FIG. 3.

Figure 4:
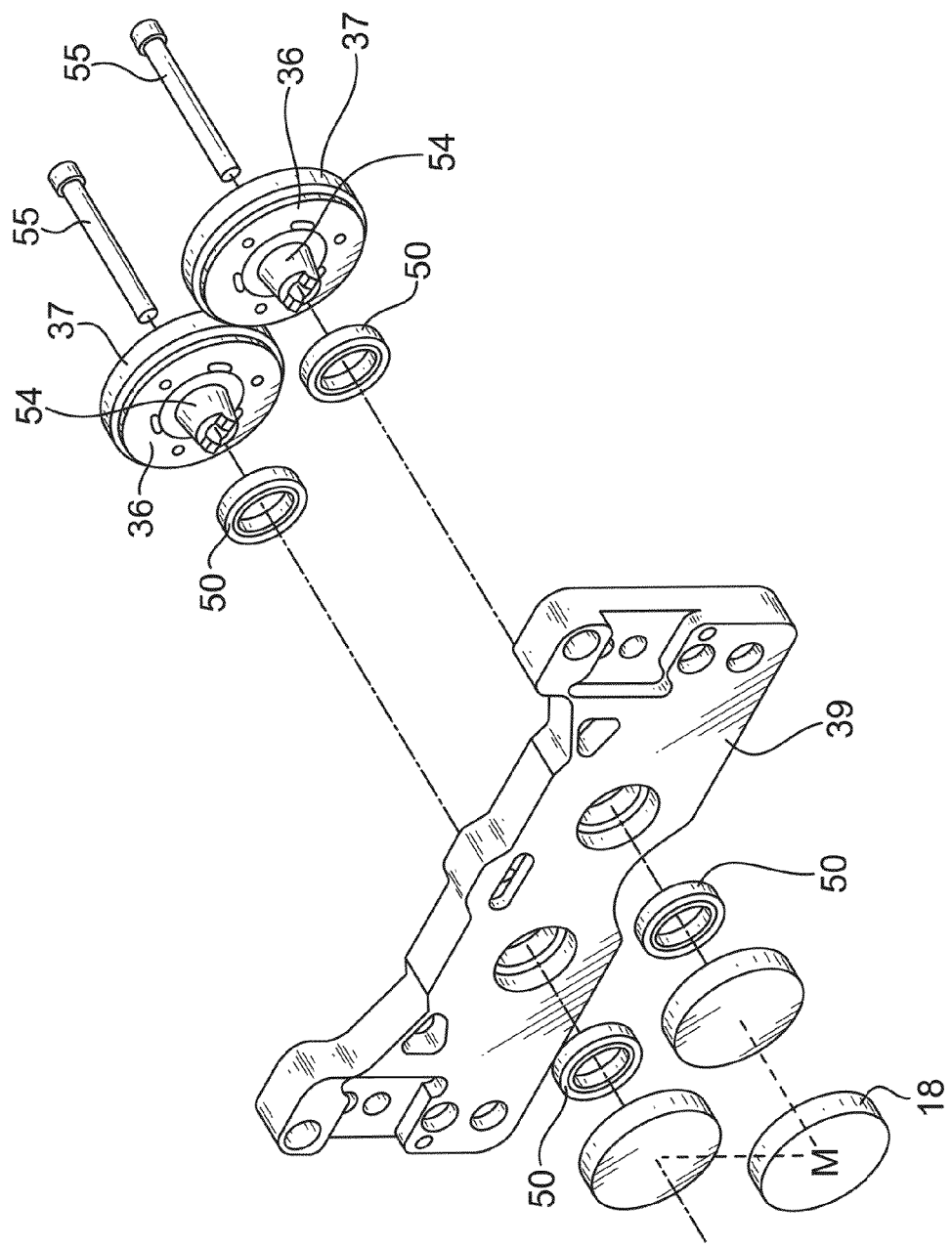
FIG. 4 is an expanded perspective view of a feed plate and accompanying drive rollers, according to the embodiments of the subject invention.

Still referencing FIG. 2 and now also FIG. 4, the feed plate 39 may comprise a generally rigid piece of material suitably strong for supporting the drive roll assembly. In one embodiment, the feed plate 39 may be separate from the housing of the wire feeder 11 and affixed to the housing via fasteners or other means. Accordingly, feed plate 39 is mounted onto or within the wire feeder housing. The feed plate 39 may be comprised of aluminum. However, the feed plate 39 may be comprised of other materials including steel in any of various alloys or other non-metallic materials having sufficient strength and rigidity for supporting the drive assembly. It should be noted that during operation of the wire feeder 11, the feed plate 39 may be subject elevated temperature. Accordingly, the feed plate 39 will have the requisite rigidity and the ability to withstand high temperatures without failure. In one particular embodiment, the feed plate 39 may be constructed from an electrically non-conducting material for preventing arcing or sparking resulting from differences in voltage potential between components of the drive roll assembly, examples of which may include ceramic based materials. Alternatively, feed plate 39 may be constructed from polymeric material. Still, any suitable material may be used to construct the feed plate 39 as chosen with sound engineering judgment. The feed plate 39 may have a thickness in the range of ¼ inch to 1½ inches thick. However, any thickness of material, or length and width of material, may be chosen with sound engineering judgment. It is noteworthy to mention that alternate embodiments of the subject invention are contemplated wherein the drive roll assembly is connected directly to the housing of the wire feeder 11, and not to the feed plate 39. In this instance, the housing 39*a* itself may be sufficiently rigid and strong to support the drive roll assembly functioning effectively as the feed plate 39. Still it is to be construed that any manner of supporting the drive roll assembly may be chosen without departing from the intended scope of coverage of the embodiments of the subject invention.

FIG. 4 shows an exemplary embodiment of one configuration of feed plate 39 and drive rollers 36. In this configuration, bearings 50 may be installed into the feed plate 39, which may have recesses that receive the outer bearing race. In particular, four (4) bearings are shown, although the number of bearings 50 may vary without departing from the intended scope of coverage of the embodiments of the subject invention. Shafts 55, or alternatively pins, may connect the drive rollers 36 with the bearings 50. It follows that the shafts 55 may be received into the bearings 50 and may be press fit into a fixed relationship with respect to the bearing inner race. In this manner, the driver roller 36, shaft 55 and inner bearing race rotate together.

Figure 5:
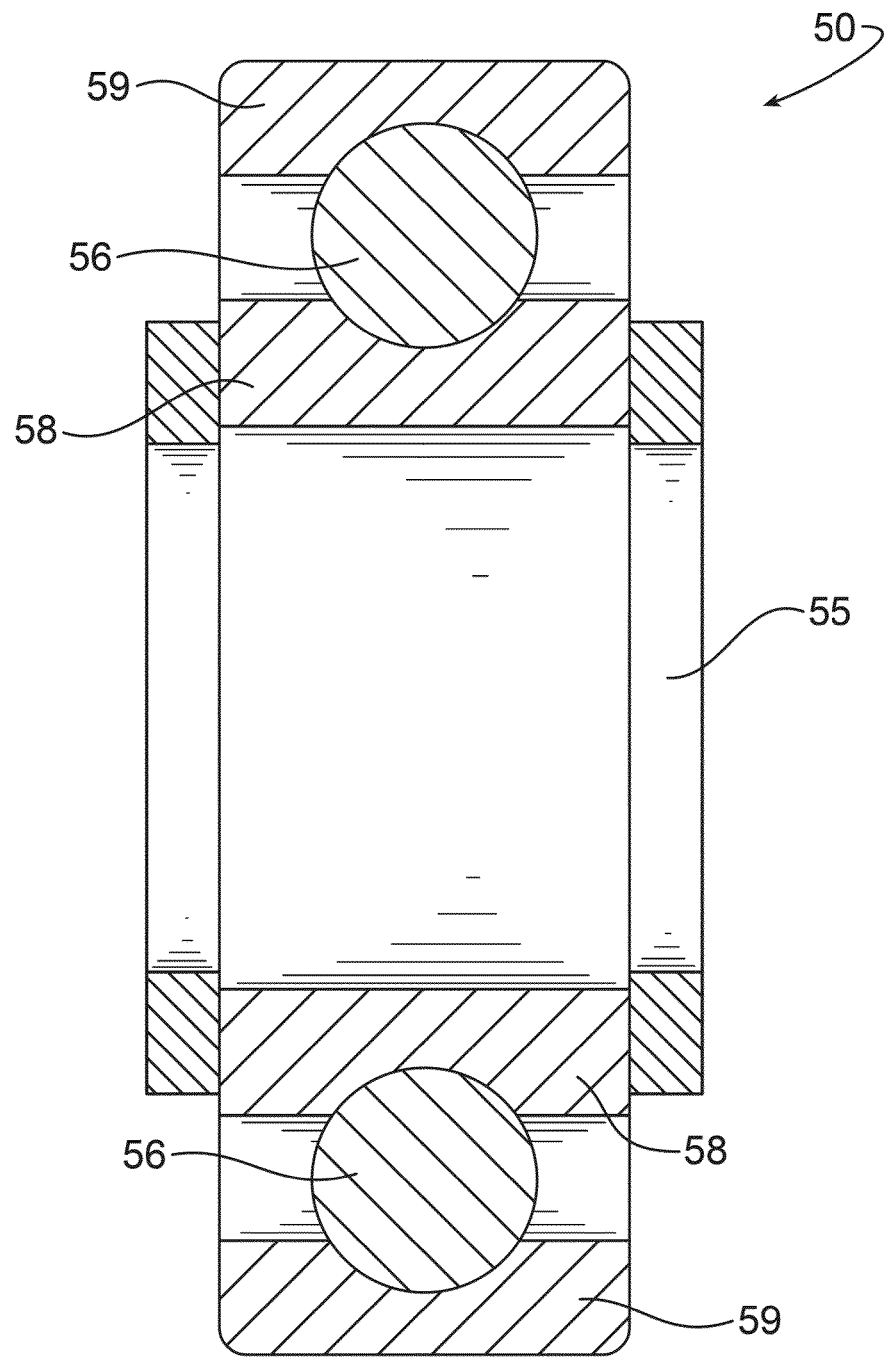
FIG. 5 is cutaway side view of a non-conductive friction reducing device, according to the embodiments of the subject invention.

With continued reference to FIG. 4 and now to FIG. 5, in one exemplary embodiment, one or more components of the drive roll assembly may be constructed from non-conducting materials, i.e. electrically non-conducting or electrically insulating materials. For example, part or all of the drive roll assembly may be comprised of dielectric materials or any material(s) that substantially inhibits or prevents arcing, i.e. electrical discharging across a gap, due to differences in voltage potential. Example of these materials may include ceramic or ceramic-based material. Other types of materials may include glass. Moreover, certain types of polymeric materials may be utilized.

In one embodiment, part or all of the bearings 50 may be constructed from non-conducting materials. The bearings 50 may include a plurality of rolling elements, which may be bearing balls 56, disposed between generally circular inner 58 and outer 59 races. In one particular embodiment, the bearings balls 56, which may be spherical, are constructed from non-conducting material, while the remaining components may be constructed from more traditional materials, such as metal, e.g. steel or other alloy. Illustratively, bearing balls 56 may be made from ceramic and the inner and outer races 58, 59 may be constructed from steel. Alternatively, one or both of the races 58, 59 may be constructed from ceramic while the rolling elements are constructed from steel. In yet another embodiment, all of the bearing components may be constructed from ceramic. Still, it will be appreciated that any combination of the components making up bearing 50 may be constructed from non-conducting material without departing from the intended scope of coverage of the embodiments of the subject invention. In this way, arcing or sparks resulting from differences in the voltage potential between the electrode 13*a* contacting the drive rollers 36 and the feed plate 39, 39*a* will be substantially inhibited and/or prevented by the dielectric materials.

In another embodiment of the subject invention, one or more of the bearing components may be covered or coated with a dielectric material. In an illustrative manner, the bearing balls 56 may be covered with an outer most layer of ceramic. It will be appreciated that the entire surface of the bearing balls 56 may be covered with ceramic as the bearing balls rotate eventually making contact with the inner 58 and outer 59 bearing races over its entire surface, thus preventing or reducing sparks therebetween. Other bearing components may be completely or only partially covered with a dielectric material. For example, the inner 58 and outer 59 bearing races may be covered with ceramic, or other dielectric, on the surfaces contacting the bearing balls 56 or over its entire surface. Still, any combination of the aforementioned may be incorporated.

The invention has been described herein with reference to the disclosed embodiments. Obviously, modifications and alterations will occur to others upon a reading and understanding of this specification. It is intended to include all such modifications and alterations insofar as they come within the scope of the appended claims or the equivalence thereof.

The invention claimed is:

1. A wire feeder for conveying associated welding wire, comprising:
    a wire feeder housing having
        an apertured feed plate longitudinally disposed therein;
    a welding gun operatively connected to the wire feeder for conveying associated welding wire used in arc welding;
    one or more drive rollers with an inwardly-projecting hub rotatably connected to the apertured feed plate for engaging the associated welding wire, the one or more drive rollers being adapted to drive the associated welding wire to the welding gun;
    at least a first driver motor operatively connected to deliver power for rotating the one or more drive rollers; and,
    one or more bearings positioned between one or more drive rollers and a periphery of said inwardly-projecting hub of said one or more drive rollers and the feed plate for reducing rolling friction, said one or more bearings coaxial with each of said one or more drive rollers, wherein each of the one or more bearings is electrically non-conducting for preventing the discharge of electrical energy across the one or more bearings, and further wherein the one or more bearings comprise:
        an inner bearing race spaced apart from an outer bearing race, at least one of said one or more driver rollers adjacent thereto; and,
        a plurality of rolling elements, wherein the rolling elements are positioned between the inner race and the outer race; and, wherein the plurality of rolling elements are covered with an electrically non-conducting material.

2. The wire feeder as defined in claim 1, wherein the one or more bearings are constructed from a dielectric material.

3. The wire feeder as defined in claim 1, wherein the one or more bearings are constructed from ceramic.

4. The wire feeder as defined in claim 1, wherein the plurality of rolling elements are constructed from electrically non-conducting material.

5. The wire feeder as defined in claim 4, wherein the rolling elements are spherical bearing balls, and, wherein the bearing balls are constructed from ceramic.

6. The wire feeder as defined in claim 1, wherein at least one of the inner bearing race and the outer bearing race is constructed from ceramic.

7. The wire feeder as defined in claim 1, wherein the drive motor is a variable speed drive motor for conveying the associated welding wire at varying speeds.

8. A drive system for a welding wire feeder conveying associated electrically charged wire, comprising:
    a generally rigid feed plate;
    at least one pair of drive rollers rotatably connected with respect to the feed plate, wherein the drive rollers are spaced apart to propel the associated electrically charged wire; and,
    means for reducing rolling friction operatively positioned between the at least one pair of drive rollers and the feed plate, said means for reducing rolling friction being coaxially positioned with said at least one pair of drive rollers, and wherein said means for reducing rolling friction is electrically non-conducting for substantially preventing the discharge of electrical energy between the feed plate and the at least one pair of drive rollers, and further wherein
    the feed plate includes one or more recesses; and,
    wherein said means for reducing rolling friction comprises a ring bearing having a central aperture disposed therein:
        at least one bearing race and a plurality of rolling elements, wherein the at least one bearing race is received into the one or more recesses; and,
        wherein the at least one bearing race or the plurality of rolling elements is coated or constructed from a non-conductive dielectric material.

9. The system as defined in claim 8, wherein said means for reducing rolling friction comprises
one or more rolling elements constructed from ceramic.

10. The system as defined in claim 8, wherein
the one or more rolling elements are constructed from metal and wherein the one or more rolling elements are coated with ceramic thereby completely covering the one or more metal rolling elements.

11. The system as defined in claim 8, wherein said means for reducing rolling friction comprises
one or more rolling elements constructed from non-conducting polymeric material.

12. The system as defined in claim 8, wherein
the at least one pair of drive rollers includes first and second drive rollers, and, wherein
the position of the first drive roller is adjustable with respect to the second drive roller for driving differently sized associated wire.

13. The system as defined in claim 8, further comprising:
a wire support guides having a wire passage for channeling the associated electrically charged wire.

14. The system as defined in claim 8, wherein
the feed plate is constructed from electrically non-conducting material.

15. The system as defined in claim 14, wherein said means for reducing rolling friction comprises:
a bushing constructed from a dielectric material.

16. The system as defined in claim 15, wherein
the bushing is constructed from ceramic.

17. The system as defined in claim 15, wherein
the bushing is constructed from glass.

18. A wire feeder for conveying associated welding wire, comprising:
a wire feeder housing having an apertured feed plate longitudinally disposed therein;
a welding gun operatively connected to the wire feeder for conveying associated welding wire used in arc welding;
at least one drive roller with an inwardly-projecting hub rotatably connected to the apertured feed plate with an opposed roller having a mating inwardly-projecting hub for engaging the associated welding wire, the at least one drive roller being adapted to drive the associated welding wire to the welding gun;
at least a first driver motor operatively connected to deliver power for rotating the at least one drive roller; and,
at least one pair of bearings positioned between said drive roller and opposed roller and about a periphery of said inwardly-projecting hubs of said rollers and the feed plate for reducing rolling friction, said at least one pair of bearings coaxial with each of said rollers, wherein each of the at least one pair of bearings is electrically non-conducting for preventing the discharge of electrical energy across the one or more bearings, and further wherein each of the bearings comprise:
an inner bearing race spaced apart from an outer bearing race; and,
a plurality of rolling elements, wherein the rolling elements are positioned between the inner race and the outer race; and, wherein the plurality of rolling elements are electrically non-conducting; and further wherein
at least one of the inner bearing race and the outer bearing race is electrically non-conducting.

19. A drive system for a welding wire feeder conveying associated electrically charged wire, comprising:
a generally rigid apertured feed plate having one or more recesses;
at least one pair of drive rollers rotatably connected with respect to the feed plate, wherein the drive rollers are spaced apart to propel the associated electrically charged wire, said drive rollers having a pair of opposed rollers which matingly engage with each of said drive rollers; and,
means for reducing rolling friction operatively positioned between each of said rollers and the feed plate, said means for reducing rolling friction being coaxially positioned with said rollers, and wherein said means for reducing rolling friction is electrically non-conducting for substantially preventing the discharge of electrical energy between the feed plate and the rollers, and further wherein
each of said means for reducing rolling friction comprises:
at least one bearing race and a plurality of rolling elements, wherein the at least one bearing race is received into the one or more recesses of said feed plate; and,
wherein the at least one bearing race or the plurality of rolling elements is coated or constructed from a non-conductive dielectric material.

20. The system as defined in claim 19, wherein said means for reducing rolling friction comprises
one or more rolling elements constructed from ceramic.

21. The system as defined in claim 19, wherein
the one or more rolling elements are constructed from metal and wherein the one or more rolling elements are coated with ceramic thereby completely covering the one or more metal rolling elements.

22. The system as defined in claim 19, wherein said means for reducing rolling friction comprises
one or more rolling elements constructed from non-conducting polymeric material.

23. The system as defined in claim 19, wherein
the at least one pair of drive rollers includes first and second drive rollers, and, wherein
the position of the first drive roller is adjustable with respect to the second drive roller for driving differently sized associated wire.

24. The system as defined in claim 19, further comprising:
a wire support guides having a wire passage for channeling the associated electrically charged wire.

25. The system as defined in claim 19, wherein
the feed plate is constructed from electrically non-conducting material.

26. The system as defined in claim 25, wherein said means for reducing rolling friction comprises:
a bushing constructed from a dielectric material.

27. The system as defined in claim 26, wherein
the bushing is constructed from ceramic.

28. The system as defined in claim 26, wherein
the bushing is constructed from glass.

* * * * *